W. C. HUEBNER.
PHOTOGRAPHIC SCREEN.
APPLICATION FILED DEC. 5, 1911.

1,060,982.

Patented May 6, 1913.
5 SHEETS—SHEET 1.

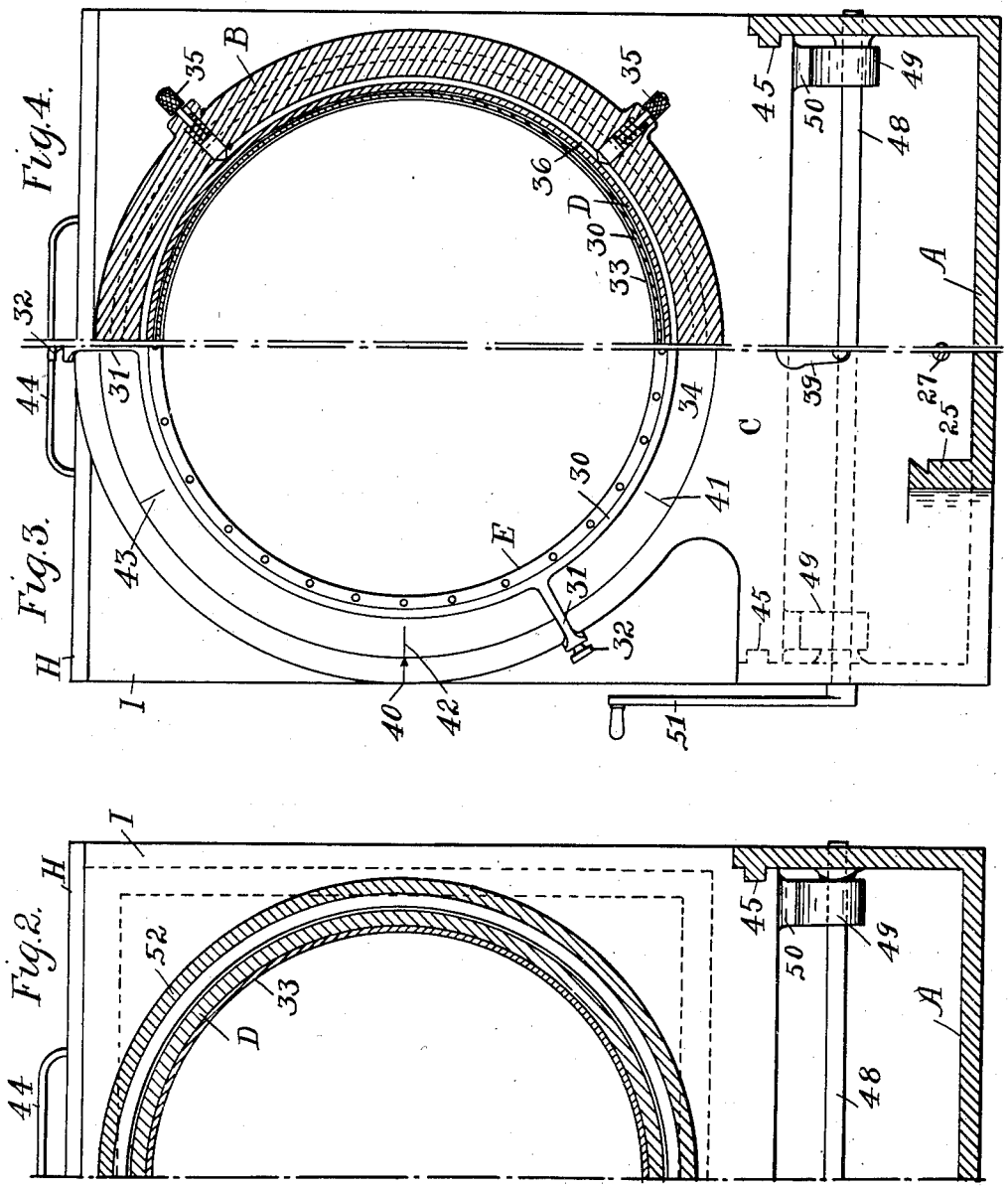

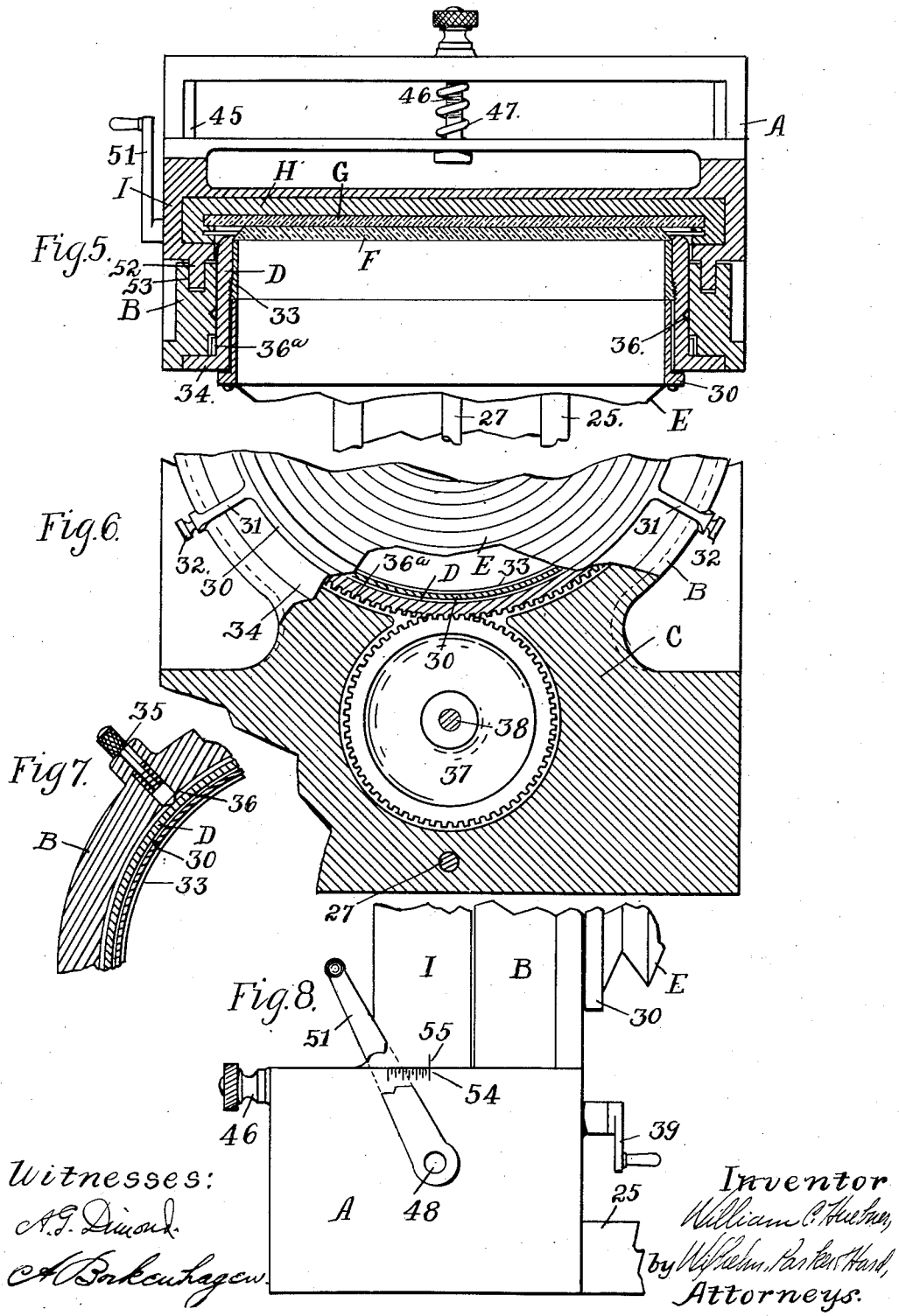

W. C. HUEBNER.
PHOTOGRAPHIC SCREEN.
APPLICATION FILED DEC. 5, 1911.

1,060,982.

Patented May 6, 1913.
5 SHEETS—SHEET 4.

Witnesses:
A. G. Dimond
A. Bakenhagen

Inventor:
William C. Huebner,
by Wilhelm, Parker & Hare,
Attorneys.

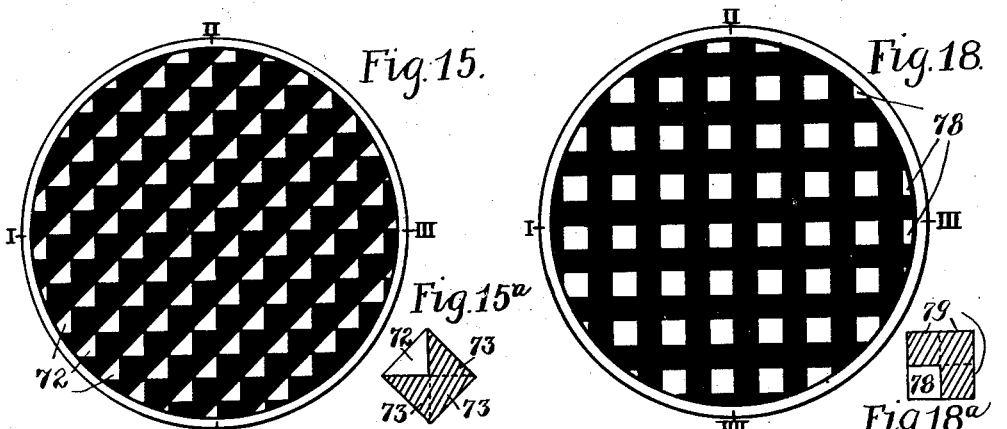

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PHOTOGRAPHIC SCREEN.

1,060,982.   Specification of Letters Patent.   Patented May 6, 1913.

Application filed December 5, 1911. Serial No. 664,017.

*To all whom it may concern:*

Be it known that I, WILLIAM C. HUEBNER, a citizen of the United States, residing at Buffalo, in the county of Erie and State of New York, have invented a new and useful Improvement in Photographic Screens, of which the following is a specification.

This invention relates to a screen for effecting the exposure of a sensitized surface by several successive fractional exposures.

The screen area is composed of minute transparent and opaque units, so shaped and arranged around a common center that by rotating the screen about this center the screen can be turned from one position corresponding with the position of one set of units, to another position corresponding with the position of another set of units. By rotating the screen from one position to another a set of opaque units and a set of transparent units are caused to change positions, thus exposing in each position of the screen only those portions of the sensitized surface which lie opposite transparent units and protecting those portions which lie opposite opaque units. In the accompanying drawings this rotatable fractional screen is represented in connection with a simple form of camera but it may be used with other styles of cameras and can be mounted in different ways so as to be rotatable and can be combined with various accessories, as the nature of the work may require.

Figure 1:
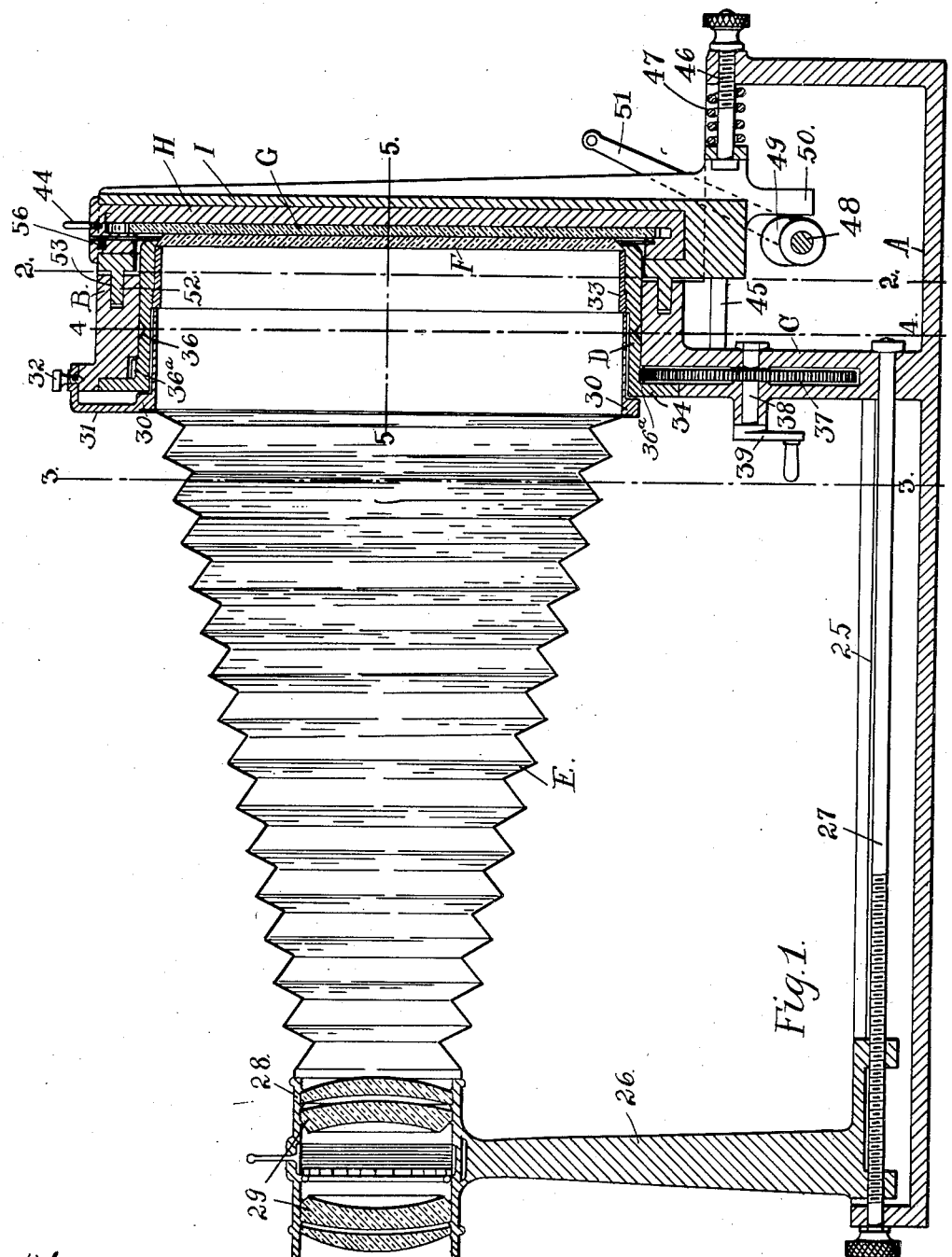
Figure 9:
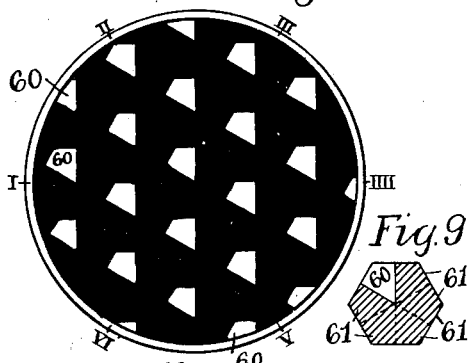

Figure 1 is a longitudinal sectional elevation of a camera provided with this improved screen. Figs. 2, 3 and 4 are half cross sections on lines 2—2, 3—3 and 4—4, Fig. 1, respectively. Fig. 5 is a horizontal section of the rear part of the camera, partly in section, on line 5—5, Fig. 1. Fig. 6 is a fragmentary front elevation and partial section of the screen frame and its actuating gear. Fig. 7 is a detached view, on an enlarged scale, of one of the spring bolts by which the screen is held in place. Fig. 8 is a fragmentary side elevation of the rear part of the camera. Figs. 9–20 are views of different screens having units of different forms and arrangement, the units being greatly enlarged. Figs. 9$^a$ to 20$^a$ are corresponding views each showing one group of units, still further enlarged.

Like reference characters refer to like parts in the several figures.

A represents the stationary base of the camera having longitudinal guides 25, in the front portion of which the lens carrying standard 26 is adjustable for focusing, as usual, by means of the longitudinal adjusting screw 27. The rear portion of the base is provided with a cylindrical bearing frame B arranged concentric with the optical axis and formed on a supporting standard C. The frame B forms a bearing for the cylindrical screen frame D which is rotatably mounted in this bearing frame.

E represents the extensible hood which extends from the casing 28 containing the lenses 29 rearwardly to a collar 30 which projects into the front portion of the screen frame and is secured to the bearing frame B by arms 31 and set screw 32.

F represents the screen which may be of glass and is secured in the rear portion of the screen frame D by a screw collar 33 or other suitable means. The screen frame is provided at the front with an annular flange 34, the front face of which is flush with the front face of the bearing frame B. The screen frame D is held against axial displacement in the bearing frame B by any suitable means, for instance, as shown, by spring bolts 35 arranged radially in the bearing frame and projecting into an annular groove 36 in the screen frame. Upon removing the rear collar 30 of the hood E from the bearing frame and withdrawing these spring bolts, the screen frame can be withdrawn from the bearing frame. The screen frame is provided on its outer side with a gear rim 36$^a$ which is engaged by a gear wheel 37 having its shaft 38 journaled in the standard C and provided with a hand crank 39 by which the wheel and through it the screen frame can be rotated. The different positions in which the screen frame must be placed for exposing the sensitized surface and which differ with different styles of screens are indicated by any suitable means, for instance, by a fixed mark or pointer 40 on the front side of the bearing frame, Fig. 3, and marks 41, 42, 43 on the front side of the screen frame. The three marks 41, 42, 43 indicate three positions of the screen and apply to a screen having its transparent and opaque units so arranged that the screen occupies three different positions 60 degrees apart.

G represents the sensitized plate and H the holder for the same which is inserted from above into vertical ways $i$, Fig. 5 in a frame I and is provided with a handle 44. The frame is so mounted in the rear portion of the camera that it can be moved backwardly and forwardly in order to adjust the distance at which the sensitized surface is held from the screen. The frame I is mounted in longitudinal guides 45 in the rear portion of the base A and is adjusted on the same by any suitable means, for instance a screw 46 and a spring 47, the screw forming an adjustable stop which limits the forward movement of the frame I and the spring holding the frame yieldingly against this stop.

The frame I can be moved backwardly against the pressure of the spring by means of a transverse shaft 48 having eccentrics 49 which engage against depending lugs 50 on the frame. This shaft is actuated by a hand lever 51 which is pressed backwardly to separate the sensitized surface from the screen. When the sensitized surface is in contact with the screen or so near the screen that the latter cannot be rotated without danger of interfering with the sensitized surface, the latter is moved backwardly by means of the eccentric shaft before the screen is rotated. In making a contact exposure in which the screen is in contact with the sensitized surface the latter is required to be moved away from the screen before the latter is rotated to the next position and after the screen has been placed in this position the sensitized surface is moved again into contact with the screen.

The frame I is provided on its front side with a cylindrical rib 52 arranged concentric with the optical axis and projecting into a corresponding recess 53 in the rear side of the bearing frame B for excluding light from the sensitized surface in the various positions of the latter. The position of the sensitized plate relative to the screen can be determined by any suitable means, for instance, by a scale 54, Fig. 8, on the side of the base and an index mark 55 on the side of the frame I in which the plate holder is mounted. The holder H for the sensitized plate is provided in its upper portion with a shutter 56 for excluding light. The screen area is composed of minute transparent and opaque units which are arranged in a regular order about a common center and may be shaped and arranged in a variety of ways, some of which are illustrated in Figs. 9–20 and 9ª–20ª. These units are combined in groups each containing one or more transparent units and a greater or less number of opaque units.

Referring to the different screens and their units represented in Figs. 9–20 and 9ª to 20ª, the screen represented in Figs. 9 and 9ª has four-sided transparent units 60 and like opaque units 61, of which one transparent unit and five opaque units form a hexagonal group. This screen is placed in six positions 60° apart, indicated by the numerals I, II, III, IIII, V and VI, in each of which positions one-sixth of the area of the sensitized plate is exposed through the transparent units.

Figure 10:
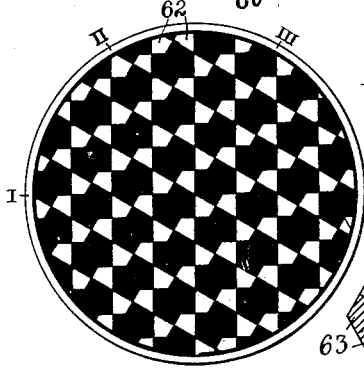

The screen represented in Figs. 10 and 10ª has four-sided transparent units 62 and opaque units 63 of which two transparent units and four opaque units form a hexagonal group. This screen is placed in three positions, 60° apart, indicated by the numerals I, II, III in each of which one-third of the area of the sensitized plate is exposed.

Figure 11:
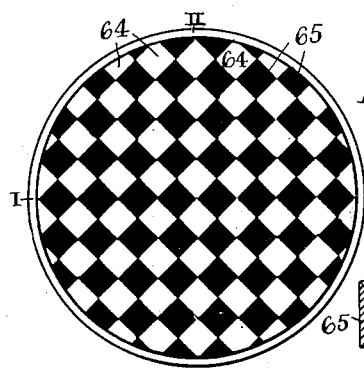

The screen represented in Figs. 11 and 11ª has three-sided transparent units 64 and like opaque units 65 of which two transparent units and two opaque units form a quadrangular group. This screen is placed in two positions, 90° apart, indicated by the numerals I and II, in each of which one-half of the area of the sensitized plate is exposed.

Figure 12:
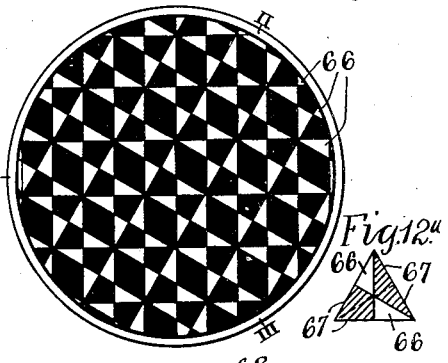

The screen represented in Figs. 12 and 12ª has three-sided transparent units 66 and like opaque units 67 of which two transparent units and four opaque units form a trigonal group. This screen is placed in three positions, 120° apart, indicated by the numerals I, II and III, in each of which one-third of the area of the sensitized plate is exposed.

Figure 13:
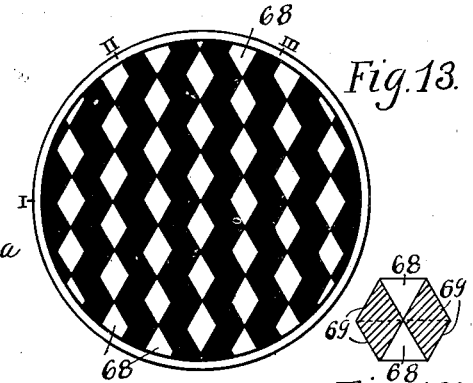

The screen represented in Figs. 13 and 13ª has three-sided transparent units 68 and like opaque units 69 of which two transparent units and four opaque units form a hexagonal group. This screen is placed in three positions, 60° apart, indicated by the numerals I, II and III.

Figure 14:
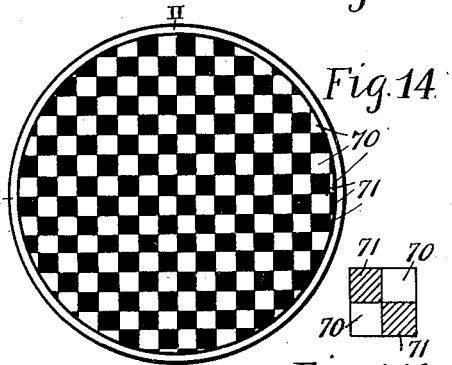

The screen represented in Figs. 14 and 14ª has square transparent units 70 and like opaque units 71 of which two transparent units and two opaque units form a square group. This screen is placed in two positions, 90° apart, indicated by the numerals I and II.

The screen represented in Figs. 15 and 15ª has triangular transparent units 72 and similar opaque units 73 of which one transparent unit and three opaque units form a square group. This screen is placed in four positions, 90° apart, indicated by the numerals I, II, III, IIII.

The screen represented in Figs. 16 and 16ª has rhomb-shaped transparent units 74 and similar opaque units 75 of which one transparent unit and two opaque units form a hexagonal group. This screen is placed in three positions, 120° apart, indicated by the numerals I, II, III.

The screen represented in Figs. 17 and 17ᵃ has four-sided transparent units 76 and similar opaque units 77 of which one transparent unit and two opaque units are combined in a triangular group. This screen is placed in three positions, 120° apart, indicated by numerals I, II, III.

The screen represented in Figs. 18 and 18ᵃ has square transparent units 78 and similar opaque units 79 of which one transparent unit and three opaque units are combined in a square group. This screen is placed in four positions, 90° apart, indicated by the numerals I, II, III, IIII.

The screen represented in Figs. 19 and 19ᵃ has triangular transparent units 80 and similar opaque units 81 of which one transparent unit and five opaque units form a hexagonal group. This screen is placed in six positions, 60° apart, indicated by the numerals I, II, III, IIII, V, VI.

The screen represented in Figs. 20 and 20ᵃ has three-sided transparent units 82 and similar opaque units 83 of which one transparent unit and two opaque units form a triangular group. This screen is placed in three positions, 120° apart, indicated by the numerals I, II, III. The screen is so mounted that the center about which the screen is turned coincides with a corner of one of the units and the arc through which the screen is turned in passing from one position to another extends from the corner of one unit to the corresponding corner of an adjacent unit. When the screen is mounted and operated in this manner a set of transparent units are caused to change positions with a set of opaque units in turning the screen from one position to another.

In each position the screen exposes through its transparent units numerous equally distributed points on the sensitized surface which in the aggregate cover a certain fraction of that surface, so that the several exposures through the screen in its several successive positions cover the entire area of the sensitized surface except in so far as the exposed points are separated from each other by reason of the distance between the screen and the sensitized surface or according to the opening of the lens diaphragm. If the screen were in actual contact with the sensitized surface, a screen designed for two positions would expose in each position one-half of that surface, a screen designed for three positions would expose one-third of that surface, a screen designed for four positions would expose one-fourth of that surface, and a screen designed for six positions would expose one-sixth of that surface. The several exposures produce on the sensitized surface printing points which are separated more or less, as stated, and each exposure can be separately timed, as may be desired, and the operation can be repeated with the screen in each or some of the exposing positions, as may be deemed desirable. Negatives so produced when developed, fixed and dried in any suitable manner, can be used in black and white work in the ordinary manner of printing or reproduction and produce a finer tone gradation than can be secured by a halftone screen of the usual kind in which the entire area of the sensitized surface is acted upon or exposed at the same time except in so far as the light is excluded by the lines on the screen.

The rotary adjustment of the screen permits the screen to be adjusted to each position quickly and with great exactness and convenience, and the total effect of the successive fractional exposures is to join the same without leaving vacant spaces except in so far as the exposed points on the negative are separated in order to produce proper printing points. This rotary fractional screen can also be used in color photography in various ways, for instance, in connection with color filters of various kinds. This rotatable screen can also be used for printing in each position upon a separate negative, in which case the printing from the negatives is effected by printing one negative after the other, each in its appropriate position, upon the sensitized surface.

The mechanical details of the mounting of the screen, of the devices by which the screen is rotated and of the devices by which the sensitized plate is adjusted can be modified in various ways without departing from the essence of the invention.

I claim as my invention:

1. The combination of a screen for the fractional exposure of a sensitized surface which screen has its area composed of transparent units and opaque units arranged in such order about a common center that by rotating the screen about this center from one position to another a set of transparent units and a set of opaque units are caused to exchange positions, and a support in which said screen is rotatable about said center, substantially as set forth.

2. The combination of a screen for the fractional exposure of a sensitized surface which screen has its area composed of transparent units and opaque units arranged in such order about a common center that by rotating the screen about this center from one position to another a set of transparent units and a set of opaque units are caused to exchange positions, a support in which said screen is rotatable about said center, and means for rotating said screen, substantially as set forth.

3. The combination with a screen having its area composed of transparent units and opaque units arranged in such order about a common center located in the optical axis that by rotating the screen about this axis from one position to another a set of transparent units and a set of opaque units are caused to exchange positions, of a camera provided with a bearing in which said screen is rotatably mounted, and means for rotating said screen from one position to another, substantially as set forth.

4. The combination of a screen for the fractional exposure of a sensitized surface having its area composed of transparent units and opaque units arranged in such order about a common center that by rotating the screen about this center from one position to another a set of transparent units and a set of opaque units are caused to exchange positions, a bearing in which said screen is rotatable about said center, and a support for a sensitized plate which is adjustable toward and from the screen, substantially as set forth.

5. The combination with a camera, of a rotatable screen having its area composed of transparent and opaque units arranged in a regular order around the center about which the screen is rotatable, a holder for a sensitized plate arranged in rear of the screen and movable toward and from the same, a stop which limits the movement of said holder toward the screen, and a spring which holds the holder yieldingly against said stop, substantially as set forth.

6. The combination with a camera provided with a bearing which is concentric with the optical axis, of a screen having its area composed of transparent and opaque units arranged in a regular order around a common center, a rotatable frame in which said screen is secured and which is rotatably mounted in said bearing, and means for rotating the screen frame in said bearing, substantially as set forth.

7. The combination with a camera frame having its rear portion provided with a bearing which is concentric with the optical axis, a rotatable screen frame arranged within said bearing, a fractional screen secured in said screen frame, means for rotating said screen frame, and a hood having its rear end arranged adjacent to said screen frame, substantially as set forth.

Witness my hand, this 1st day of December, 1911.

WILLIAM C. HUEBNER.

Witnesses:
  EDWARD C. HARD,
  CYESTA B. HORNBECK.